United States Patent
Gupta et al.

(10) Patent No.: US 12,513,143 B2
(45) Date of Patent: Dec. 30, 2025

(54) VIRTUAL CREDENTIAL AUTHENTICATION BASED ON BROWSING CONTEXT

(71) Applicant: Capital One Services, LLC, McLean, VA (US)

(72) Inventors: Varun Gupta, Edison, NJ (US); Allison Fenichel, Brooklyn, NY (US); Amanda Sneider, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/327,391

(22) Filed: Jun. 1, 2023

(65) Prior Publication Data
US 2023/0319038 A1    Oct. 5, 2023

Related U.S. Application Data

(62) Division of application No. 17/139,733, filed on Dec. 31, 2020, now Pat. No. 11,695,764.

(51) Int. Cl.
*G06Q 20/38* (2012.01)
*G06F 16/955* (2019.01)
(Continued)

(52) U.S. Cl.
CPC ........ *H04L 63/0876* (2013.01); *G06F 16/955* (2019.01); *G06Q 20/351* (2013.01);
(Continued)

(58) Field of Classification Search
CPC . H04L 67/535; H04L 63/0876; G06Q 20/351; G06Q 20/3821; G06Q 20/385; G06Q 30/018; G06F 16/955
(Continued)

(56) References Cited

U.S. PATENT DOCUMENTS 6,980,969 B1 * 12/2005 Tuchler ............... G06Q 20/10
705/38
10,296,897 B1    5/2019 Wu et al.
(Continued)

FOREIGN PATENT DOCUMENTS

EP       1017030 A2    7/2000
WO   2018083663 A1    5/2018

OTHER PUBLICATIONS

"A novel verification method for payment card systems," by Abdulrahman Alhothaily; Arwa Alrawais; Xiuzhen Cheng; and Rongfang Bie. Pers Ubiquit Comput (2015) 19: pp. 1145-1156. Published Online: Aug. 30, 2015. (Year: 2015).*
(Continued)

*Primary Examiner* — Sara C Hamilton
(74) *Attorney, Agent, or Firm* — Harrity & Harrity, LLP

(57) ABSTRACT

In some implementations, an authentication device may receive information related to website browsing activity at a client device. The information related to the website browsing activity may include information associated with a web address for a current website where information associated with a virtual credential was entered. The authentication device may identify one or more valid web addresses associated with the virtual credential, which may be valid only for an entity associated with the one or more valid web addresses. The authentication device may transmit, to the client device, information to indicate whether the website browsing activity is authenticated based on a comparison of the web address for the current website where the information associated with the virtual credential was entered and the one or more valid web addresses associated with the virtual credential.

20 Claims, 7 Drawing Sheets

(51) Int. Cl.
  *G06Q 20/34* (2012.01)
  *G06Q 30/018* (2023.01)
  *H04L 9/40* (2022.01)
  *H04L 67/50* (2022.01)
  *G06Q 40/02* (2023.01)

(52) U.S. Cl.
  CPC ........ *G06Q 20/3821* (2013.01); *G06Q 20/385* (2013.01); *G06Q 30/018* (2013.01); *H04L 67/535* (2022.05); *G06Q 40/02* (2013.01)

(58) Field of Classification Search
  USPC .......................................................... 705/44
  See application file for complete search history.

(56) References Cited

U.S. PATENT DOCUMENTS

| | | | |
|---|---|---|---|
| 11,880,821 B2* | 1/2024 | Benkreira | G06F 40/174 |
| 2009/0132417 A1 | 5/2009 | Scipioni et al. | |
| 2015/0052005 A1 | 2/2015 | Howe | |
| 2015/0052053 A1 | 2/2015 | Howe | |
| 2017/0011440 A1 | 1/2017 | Shauh et al. | |
| 2017/0076277 A1 | 3/2017 | Zhou et al. | |
| 2017/0132624 A1 | 5/2017 | Muchang et al. | |
| 2021/0103918 A1* | 4/2021 | Harmer | G06Q 20/351 |
| 2021/0217022 A1 | 7/2021 | Loucks et al. | |
| 2021/0256503 A1 | 8/2021 | Nguyen et al. | |
| 2022/0210154 A1 | 6/2022 | Gupta et al. | |

OTHER PUBLICATIONS

Alhothaily A., et al., "A Novel Verification Method for Payment Card Systems," Personal and Ubiquitous Computing, Aug. 2015, vol. 19, pp. 1145-1156.

Extended European Search Report for Application No. EP21218007, mailed on May 17, 2022, 8 pages.

* cited by examiner

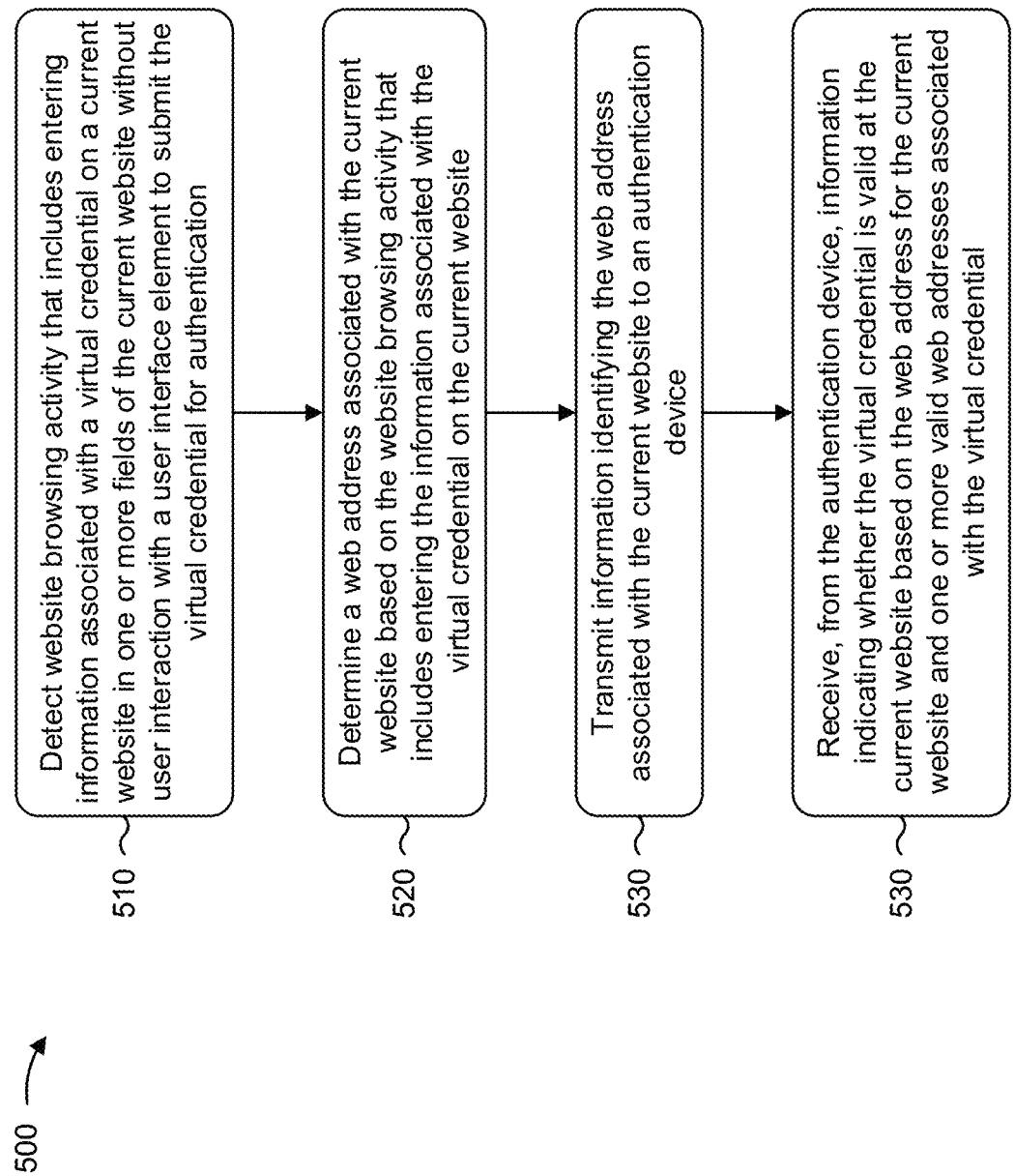

VIRTUAL CREDENTIAL AUTHENTICATION BASED ON BROWSING CONTEXT

RELATED APPLICATION

This application is a division of U.S. patent application Ser. No. 17/139,733, filed Dec. 31, 2020, which is incorporated herein by reference in its entirety.

BACKGROUND

A virtual credential, sometimes referred to as a virtual payment credential, a virtual card number, and/or a virtual credit card, among other examples, is a computer-generated version of a primary payment credential (e.g., a credit card number). The virtual credential may be linked to the primary payment credential and used as a substitute for the primary payment credential in a transaction (e.g., when shopping online, by phone, or in other contexts where a transaction card is not required to be physically presented to a merchant). For example, a bank may issue a transaction card (e.g., a credit card), and a transaction management system of the bank may also issue one or more virtual card numbers that can be used with different merchant transaction systems. In this case, the transaction management system may configure each virtual credential to be associated with a particular merchant. For example, a first virtual credential may be usable with a first merchant only, a second virtual credential may be useable with a second merchant only, and so on. Each virtual credential may be linked to the primary credential in the transaction management system to enable transactions using a particular virtual credential to be charged to an account associated with the primary credential.

SUMMARY

In some implementations, a system for authenticating virtual credentials includes one or more memories and one or more processors, communicatively coupled to the one or more memories, configured to: receive information related to website browsing activity at a client device, wherein the information related to the website browsing activity includes information associated with a web address for a current website where information associated with a virtual credential was entered, and wherein the website browsing activity includes input of the information associated with the virtual credential in one or more fields of the current website without user interaction with a user interface element to submit the virtual credential for authentication; identify one or more valid web addresses associated with the virtual credential, wherein the virtual credential is valid only for an entity associated with the one or more valid web addresses; and transmit, to the client device, information to indicate whether the website browsing activity is authenticated based on a comparison of the web address for the current website where the information associated with the virtual credential was entered and the one or more valid web addresses associated with the virtual credential.

In some implementations, a method for authenticating virtual credentials includes receiving, by an authentication device, information identifying a web address for a current website where information associated with a virtual credential was entered, wherein the information identifying the web address for the current website is received from a client device based on website browsing activity that includes input of the information associated with the virtual credential in one or more fields of the current website without user interaction with a user interface element to submit the virtual credential for authentication; identifying, by the authentication device, one or more valid web addresses associated with an entity for which the virtual credential is valid; and transmitting, by the authentication device, to the client device, information to indicate whether a transaction request attempted on the current website is authenticated, wherein the information transmitted to the client device indicates that the transaction request is authenticated based on the web address for the current website satisfying a condition, or wherein the information transmitted to the client device indicates that the transaction request is not authenticated based on the web address for the current website failing to satisfy the condition.

In some implementations, a non-transitory computer-readable medium storing a set of instructions includes one or more instructions that, when executed by one or more processors of a device, cause the device to: detect website browsing activity that includes entering information associated with a virtual credential on a current website in one or more fields of the current website without user interaction with a user interface element to submit the virtual credential for authentication; determine a web address associated with the current website based on the website browsing activity that includes entering the information associated with the virtual credential on the current website; transmit information identifying the web address associated with the current website to an authentication device; and receive, from the authentication device, information indicating whether the virtual credential is valid at the current website based on the web address for the current website and one or more valid web addresses associated with the virtual credential.

BRIEF DESCRIPTION OF THE DRAWINGS

FIGS. 4-5 are flowcharts of example processes relating to authenticating a virtual credential based on a website browsing context.

DETAILED DESCRIPTION

Figure 1A:
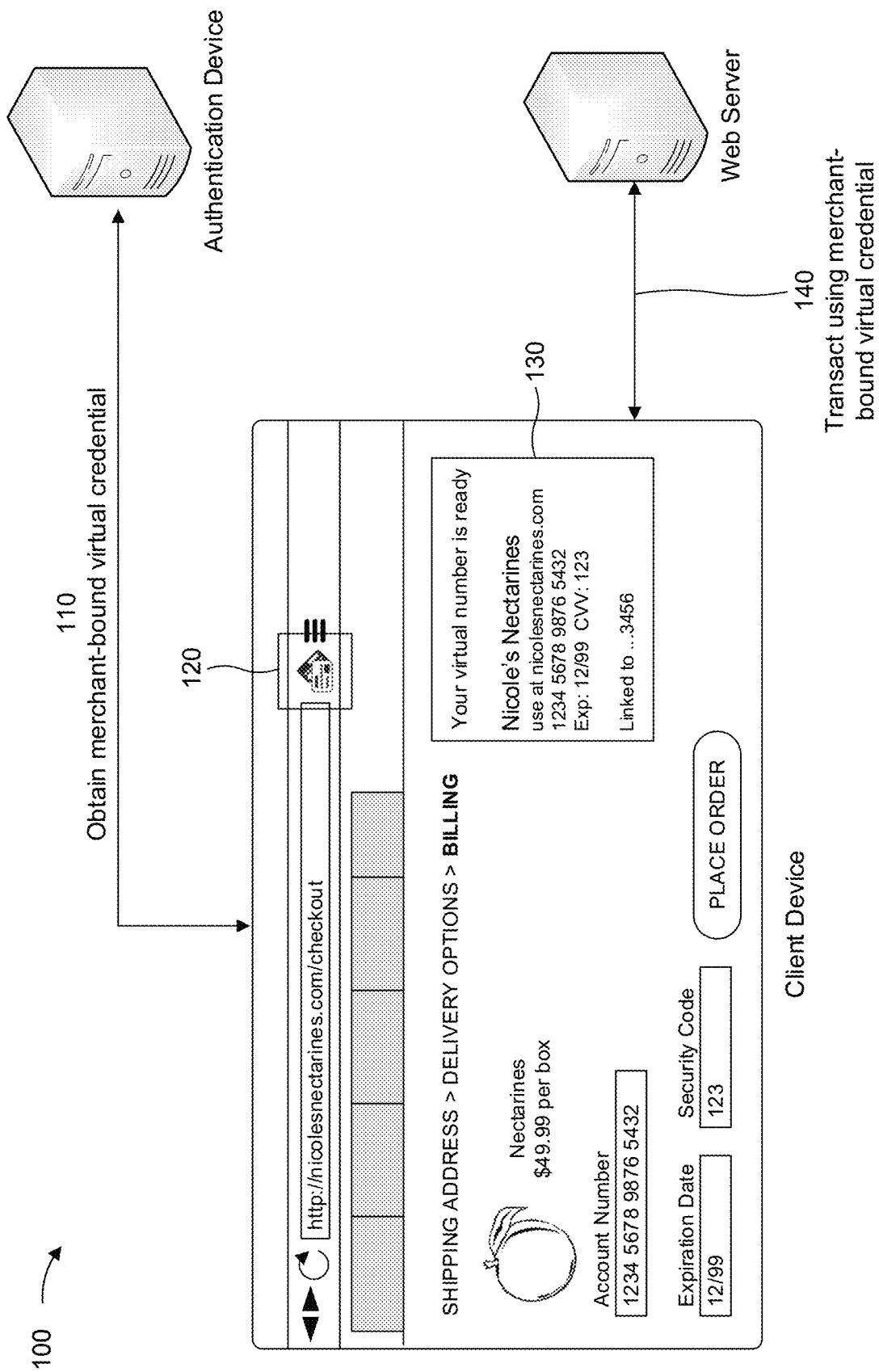
FIGS. 1A-1C are diagrams of an example implementation relating to authenticating a virtual credential based on a website browsing context.

The following detailed description of example implementations refers to the accompanying drawings. The same reference numbers in different drawings may identify the same or similar elements.

As described above, a virtual credential is a computer-generated version of a primary payment credential (e.g., a credit card number) that may be linked to and used as a substitute for the primary payment credential in a transaction. For example, a bank may issue a transaction card (e.g., a credit card), and a transaction management system (e.g., a transaction backend system) of the bank may also issue one or more virtual card numbers that can be used with different merchant transaction systems. In this case, the transaction management system may configure each virtual credential to be associated with a particular merchant. For example, a first virtual credential may be usable with a first merchant only, a second virtual credential may be useable with a second merchant only, and so on. Each virtual credential may be linked to the primary credential in the transaction management system to enable transactions using a particular virtual credential to be charged to an account associated with the primary credential.

Accordingly, because virtual credentials can generally be used in the same way as an actual credit card (e.g., except in cases where a physical credit card has to be swiped or presented in order to verify an identity), virtual credentials can offer increased security in transactions that occur in a context where a physical transaction card is not required to be physically presented to a merchant (e.g., when shopping online, by phone, or in other contexts where a transaction card is not required to be physically presented to a merchant). For example, if a security breach at a particular merchant were to result in a first virtual credential being exposed or otherwise compromised (e.g., to a hacker or fraudster), the virtual credential could be used only at the particular merchant and would be unusable with any other merchant(s). In this way, using the virtual credential as a payment method may reduce a risk and/or an extent to which the virtual credential can be fraudulently used, thereby improving information security and/or reducing monetary losses relative to use of a regular payment credential. In such a case, the compromised virtual credential may be invalidated and a new virtual credential may be generated without affecting the primary payment credential and/or any other virtual credentials that may be linked to the primary payment credential. Furthermore, virtual credentials may provide similar protection against phishing scams or other fraud or abuse by unscrupulous merchants. This may minimize an inconvenience associated with issuing a new primary payment credential and may reduce utilization of network resources associated with updating many different merchant systems with new payment credentials.

Although binding a virtual credential to a particular merchant can improve security and/or reduce a risk of credit card fraud, in some cases the merchant-specific binding may result in incorrect decisions to reject an authorization request using a virtual credential. For example, when a user initiates a checkout process on a merchant website to request authorization for a transaction using a virtual credential, the merchant may provide one or more merchant attributes (e.g., a merchant name or other merchant identifier) together with information related to the virtual credential. In this case, because the virtual credential is bound to the merchant, the virtual credential may be valid only at a web address associated with the merchant website. However, in some cases, the binding to the web address associated with the merchant website may lead to incorrect decline decisions (e.g., in cases where the user attempts to use the virtual credential at a different website that is a valid alias of the original web address bound to the virtual credential and/or another website in a group of websites that are associated with affiliated merchants). These incorrect decline decisions are highly inconvenient and can lead to significant resource consumption. For example, an incorrect decline decision may consume computing resources and/or network resources because the merchant website has to communicate with the user to notify the user that the transaction was declined, the user has to provide a different payment method and/or communicate with the bank to obtain a new virtual credential for the new merchant site(s), the transaction has to be attempted again, and so on. Accordingly, one way to potentially reduce false declines may be to determine, in real-time as a user is using a website and prior to the user submitting a purchase via the website, whether the website is associated with an entity (e.g., a merchant) bound to the virtual credential. However, existing techniques to authenticate a virtual credential lack such a capability because the merchant website is validated only after an authorization request is sent to an authentication system. Furthermore, validating the merchant website only after the authentication request is sent undermines the security and fraud prevention aspects of a virtual credential, because the user may enter information associated with the virtual credential on a spoof website masquerading as the legitimate merchant website.

Some implementations described herein may determine, in real-time as a user is using a website and prior to the user submitting a request to initiate a purchase via the website using a virtual credential, whether the website is associated with a merchant or another suitable entity bound to the virtual credential. For example, in some implementations, a client device may execute a web browser with which a user can interact to visit different websites, and a browser extension installed in the web browser may communicate with a transaction backend system to generate, authenticate, and/or otherwise manage a virtual credential that is linked to a primary payment credential. Accordingly, when the browser extension detects that a user has started to enter information associated with a virtual credential on a website and/or has selected an option to populate one or more fields in the website with the information associated with the virtual credential, the browser extension may identify the web address (e.g., uniform resource locator (URL)) associated with the website and send the web address to an authentication device. In this case, because the browser extension is running in the web browser where the user is actively interacting with the checkout page, the browser extension can detect that information associated with the virtual credential has been entered into the checkout page and/or detect a request to use the virtual credential before the transaction is initiated or otherwise requested. In this way, prior to any authorization request, the authentication server can check the current web address against the original web address for which the virtual credential was created and/or any known valid aliases for the original web address to determine whether to authenticate the transaction. Furthermore, the authentication server may store information related to various invalid web addresses (e.g., known phishing sites) such that the transaction may be blocked to prevent fraud when there is a suspicious non-matching web address before the information associated with the virtual credential is submitted to a web server associated with the invalid web address.

Figure 1B:
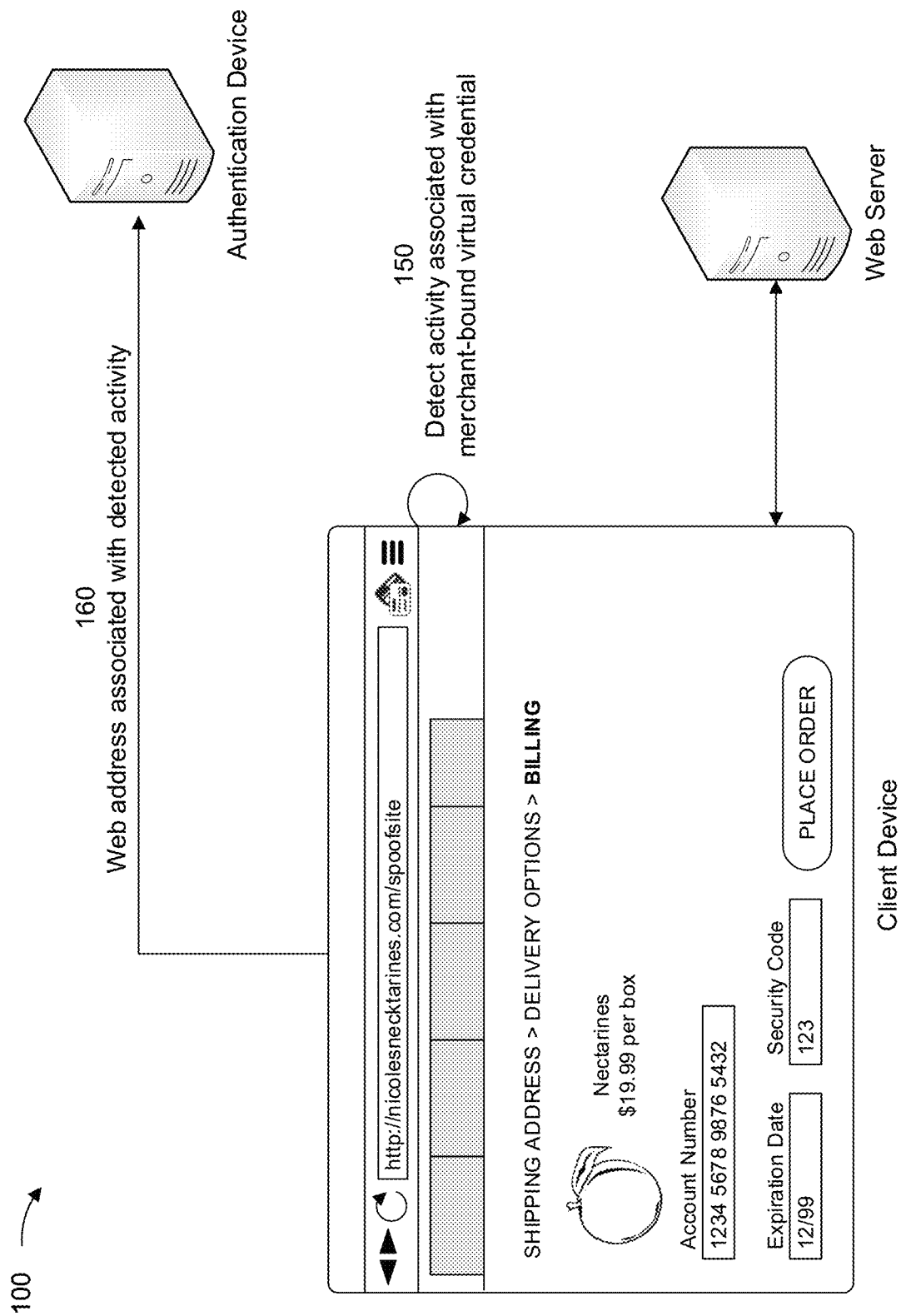
Figure 1C:
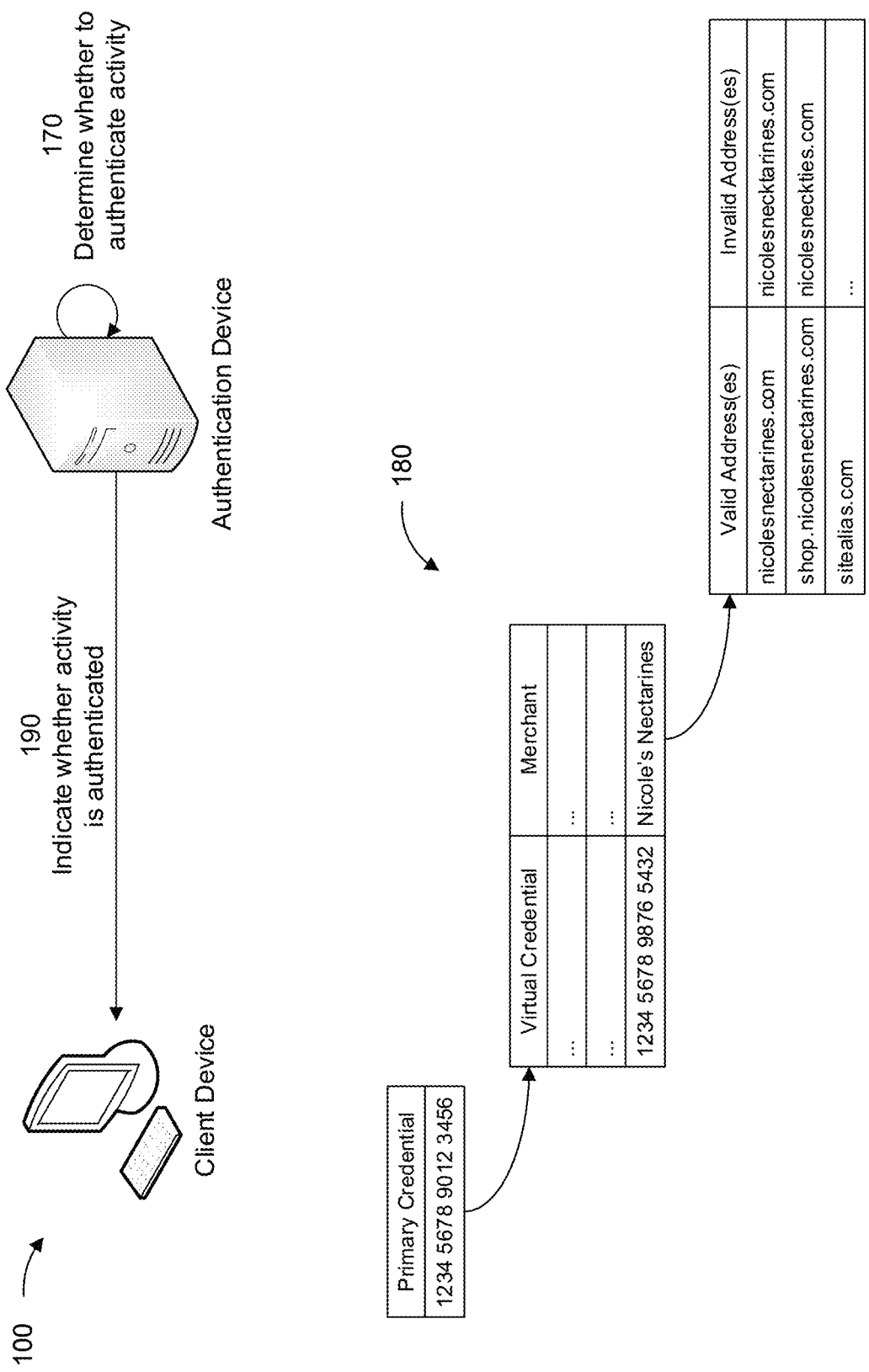

FIGS. 1A-1C are diagrams of an example implementation 100 relating to authenticating a virtual credential based on a website browsing context. As shown in FIGS. 1A-1C, example 100 includes a client device executing a web browser that includes one or more browser extensions, a web server, and an authentication device. The client device, the web server, and the authentication device are described in more detail in connection with FIG. 2 and FIG. 3.

As shown in FIG. 1A, and by reference number 110, a client device may obtain a merchant-bound virtual credential from an authentication device in order to initiate a transaction on a web page hosted on a web server. For example, as shown by reference number 120, a browser extension may be installed in the web browser to determine whether a current web page rendered in the web browser includes one or more fields to enter payment information (e.g., the current website is a checkout page), and the browser extension may display a user interface or otherwise activate an option to generate a merchant-bound virtual credential when the current web page includes one or more fields to enter payment information. For example, in FIG. 1A, the current web page includes an account number field, an expiration date field, a security code field, user interface elements (e.g., text and/or images) that relate to one or more items to be purchased (e.g., items in a shopping cart), text indicating that the current web page is for entering billing information, and one or more interactive elements (e.g., a button) to place an order. Accordingly, based on detecting the various fields and/or other elements of the web page that are indicative of a checkout page or another suitable page where payment information can be entered, the browser extension may provide the user of the client device with an option to generate a merchant-bound virtual credential as a payment method. For example, if the user selects the option to generate the merchant-bound virtual credential, the browser extension may identify a web address associated with the current web page (e.g., a host name, a domain name, a fully qualified domain name, and/or a URL, among other examples), and may cause the web address to be sent to the authentication device.

In some implementations, based on the web address sent from the client device, the authentication device may generate a virtual credential that is bound to (e.g., valid only for) a merchant associated with the current web page. For example, when the browser extension is installed in the web browser of the client device, a user of the client device may perform a registration process to identify one or more primary payment credentials belonging to the user. For example, the browser extension and the authentication device may be associated with a financial institution (e.g., a credit card provider and/or a bank, among other examples) where the user holds one or more accounts associated with the one or more primary payment credentials. Accordingly, when the user selects the option provided by the browser extension to generate the merchant-bound virtual credential, the authentication device may identify the merchant associated with the web address (e.g., by performing a lookup in a domain name registrar) and generate a virtual credential that is linked to a primary payment credential associated with the user and valid only for the merchant operating the current web page. For example, the authentication device may transmit information associated with the virtual credential to the client device, and the browser extension installed in the web browser may display an interface that indicates that the virtual credential is available to use. For example, as shown by reference number 130, the interface may indicate a name of the merchant (e.g., "Nicoles's Nectarines") and/or a website (e.g., "nicolesnectarines.com") where the virtual credential is valid. Additionally, as further shown, the interface may include relevant details associated with the virtual credential, which may include the account number, expiration date, security code (or card verification value (CVV)), and/or the primary payment credential linked to the virtual credential.

Accordingly, as further shown in FIG. 1A, and by reference number 140, the user of the client device may then communicate with the web server to conduct a transaction using the merchant-bound virtual credential. For example, the user may manually enter the information associated with the virtual credential into the corresponding fields of the web page, and/or the information associated with the virtual credential may be automatically populated into the corresponding fields of the web page (e.g., by the browser extension), among other examples. The user of the client device may then select a user interface element (e.g., the "Place Order" button shown in FIG. 1A) to submit the virtual credential information to the web server for authentication. For example, the web server may receive the virtual credential information entered into the web page displayed at the client device and communicate with the authentication device to request authorization for a transaction using the virtual credential information. For example, the web server may transmit the virtual credential information and one or more merchant attributes (e.g., a merchant name, city, state, zip code, country code, and/or category code) to the authentication device, and the authentication device may authorize the transaction in cases where the merchant attributes match the merchant attributes associated with the web address with which the user was interacting when the request to generate the virtual credential was initiated. In other words, by establishing a binding between the virtual credential and the web address with which the user was interacting when the request to generate the virtual credential was initiated, the authentication device may approve or decline authorization requests associated with the virtual credential, depending on whether the authorization request(s) include merchant attributes that match the merchant attributes associated with the web address bound to the virtual credential. Furthermore, while some implementations are described herein in a context where the virtual credential is generated based on a user selecting an option provided by a browser extension, the virtual credential may be generated using other suitable techniques (e.g., using a mobile application, using a website, and/or over the phone, among other examples).

As shown in FIG. 1B, and by reference number 150, the browser extension installed in the web browser of the client device may subsequently detect activity in which information associated with the merchant-bound virtual credential is entered into one or more fields of a current web page rendered in the web browser. In other words, the authentication device has previously created a virtual credential that is allowed to be used only with a merchant associated with a particular website, and the user of the client device is attempting to use the virtual credential again. In this case, the browser extension may detect the activity associated with the merchant-bound virtual credential on a current web page and attempt to validate the identity of an entity operating the current web page prior to the user interacting with one or more user interface elements to submit the virtual credential information to a web server. For example, in some cases, the current web page may be the same web page that the user was interacting with when the virtual credential was created (e.g., associated with the same URL, host name, domain name, and/or fully qualified domain name), a valid alias for the web page with which the user was interacting when the virtual credential was originally created (e.g., associated with an alternate URL belonging to the same merchant), and/or another merchant that is affiliated with the merchant bound to the virtual credential. Alternatively, in some cases, the web server hosting the web page displayed at the client device may be associated with a phishing site or a fraudulent website that is masquerading as a legitimate website in order to illicitly acquire user payment information.

Accordingly, when the browser extension detects that information with the virtual credential has been input into one or more fields of the current web page (e.g., manually by the user and/or automatically by the web browser) and/or that the user has requested to input information associated with the virtual credential into the field(s) of the current web page, the browser extension may communicate with the authentication device to authenticate the current web page (e.g., determine whether the current web page is associated with a valid web address for the merchant bound to the virtual credential) prior to any user interaction with a user interface element (e.g., a payment button) to submit the virtual credential for authentication. In this way, the authentication device may facilitate (e.g., approve) transactions that originate from web addresses that are validly associated with the merchant bound to the virtual credential and/or prevent fraud by blocking transactions that originate from web addresses that are not validly associated with the merchant bound to the virtual credential. For example, when the browser extension detects that information associated with the virtual credential has been input into the current web page and/or detects a user intent (e.g., based on other website interactions) to input information associated with the virtual credential into the current web page, the browser extension may identify the web address associated with the current web page and/or generate one or more other parameters that are indicative of the user intent based on the current website browsing context (e.g., a navigation path to the current web page, such as a web page that directed or redirected the user to the current web page, and/or browsing activity indicating an intent to transact, such as the user performing a search for items that are in a shopping cart of the current web page, among other examples).

Accordingly, as shown by reference number 160, the client device may transmit (e.g., via the browser extension) the web address associated with the detected activity to the authentication device. In some implementations, the web address associated with the detected activity may be transmitted to the authentication device without the user interacting with one or more user interface elements to submit the virtual credential information for authentication (e.g., to prevent the user from inadvertently submitting the virtual credential information to a fraudulent website and/or to validate the identity of the entity operating the current web page to prevent a false decline in the case of a mismatching web address that is a valid alias or affiliated site associated with the original site for which the virtual credential was created). Furthermore, in some implementations, the information transmitted to the authentication device may include other relevant parameters that may indicate the user intent (e.g., website browsing context, such as session history, cookies, and/or open tabs within a browser, among other examples).

As shown in FIG. 1C, and by reference number 170, the authentication device may determine whether to authenticate the website browsing activity that includes input or a request or intent to input information associated with the virtual credential into one or more fields of a current web page displayed at the client device. For example, in some implementations, the authentication device may identify one or more valid web addresses associated with the virtual credential, which may include a web address associated with a web page with which the user was interacting when the virtual credential was originally created. Additionally, or alternatively, in cases where the virtual credential was originally created outside a website browsing context (e.g., in a mobile application and/or at a website associated with a financial institution that offers the virtual credential as a service, among other examples), the one or more valid web addresses may include one or more web addresses associated with the merchant for which the virtual credential is created. Furthermore, in some implementations, the one or more valid web addresses may include one or more aliases or other alternate web addresses that are associated with the merchant bound to the virtual credential. For example, various merchants may operate different websites and/or may own different domain names that are all associated with the same underlying merchant information (e.g., a primary website in addition to one or more websites associated with special programs, such as charitable contributions for each purchase). Additionally, or alternatively, certain merchants may operate a group of websites that are associated with different brands but nonetheless affiliated with the same entity.

Accordingly, in some implementations, the authentication device may determine one or more valid aliases for the website for which the virtual credential was created and/or one or more additional websites associated with the merchant bound to the virtual credential based on information stored in one or more data sources (e.g., one or more databases of merchant information, a domain name registry, a database of corporate affiliations, and/or a Domain Name System (DNS) that maps host names that include DNS domains and Internet Protocol (IP) addresses, among other examples). In addition, the authentication device may determine, based on the information stored in the one or more data sources, one or more invalid web addresses that are not associated with the merchant bound to the virtual credential. For example, as described above, fraudulent entities often establish phishing sites or spoofing sites that are designed to appear very similar to a legitimate merchant website in order to coax users into entering payment information that can then be used for fraudulent purposes. In some cases, the phishing sites or spoofing sites may be associated with URLs, host names, domain names, fully qualified domain names, or other web addresses that appear similar to the legitimate website (e.g., differing only by one or a few characters and/or utilizing common misspellings to masquerade as the legitimate website). Accordingly, in some implementations, the authentication device may further store information associated with one or more invalid web addresses that are known to not be associated with the merchant bound to the virtual credential.

In some implementations, the authentication device may therefore determine whether to authenticate the activity at the client device (e.g., the activity associated with attempting to use the virtual credential on a web page) based on the URL, host name, domain name, or other web address associated with the activity. For example, the authentication device may compare the URL, host name, domain name, or other web address associated with the current web page displayed at the client device (e.g., the web page where the user is attempting to input the virtual credential information) to the valid and invalid web addresses associated with the merchant bound to the virtual credential. For example, as shown by reference number 180, a primary account number (e.g., a credit card number or another primary credential) associated with a user may be linked to multiple virtual credentials or multiple virtual card numbers that are valid for use only with a particular merchant. Accordingly, an identifier of the merchant bound to the virtual credential may be used as a key or index to a table, a data structure, or other information that identifies the valid web addresses and/or the invalid web addresses associated with the merchant. In cases where the web address provided by the browser extension matches one or more of the valid web addresses associated with the merchant, the authentication device may authorize or approve the activity attempting to use the virtual credential on the current web page. In this case, a match may generally occur at any suitable granularity (e.g., a domain name match and/or a URL match), and may require an exact match because any discrepancies in the web address, however minor, may indicate that the current web page is not a valid alias or otherwise affiliated with the merchant bound to the virtual credential. Alternatively, in cases where the web address provided by the browser extension does not match any of the valid web addresses associated with the merchant and/or matches one or more of the invalid web addresses associated with the merchant (e.g., known spoofing sites), the authentication device may determine that the activity attempting to use the virtual credential on the current web page is not to be authorized.

Accordingly, as shown by reference number 190, the authentication device may transmit, to the client device, information to indicate whether the website browsing activity is authenticated based on a comparison of the web address for the current web page where the information associated with the virtual credential was entered and the one or more valid web addresses associated with the virtual credential. For example, as described above, the authentication device may indicate that the activity associated with attempting to use the virtual credential on the current web page is authorized or approved if the URL, host name, domain name, or other web address associated with the current web page matches one or more of the valid web addresses associated with the merchant bound to the virtual credential. In this case, based on the indication that the activity is authorized or approved, the browser extension may display a message on the client device to indicate that the current web page is a valid web page for the merchant, whereby the user may securely proceed with the transaction. For example, the user may input the virtual credential information into one or more fields of the current web page and interact with one or more user interface elements to submit the virtual credential information for authentication.

Alternatively, the authentication device may indicate that the activity associated with attempting to use the virtual credential information is not authorized in cases where the web address provided by the browser extension does not match any of the valid web addresses associated with the merchant and/or matches one or more of the invalid web addresses associated with the merchant. In this case, based on the indication that the activity is not authorized, the browser extension may display a warning message on the client device to indicate that the current web page is not a valid web page for the merchant. For example, the warning message may indicate that the current web page may be a phishing site and/or may indicate one or more discrepancies between the web address for the current web page and the valid web addresses associated with the merchant bound to the virtual credential. Accordingly, the warning message may alert the user to enable the user to abort the transaction before interacting with the user interface elements to submit the virtual credential information for authentication. In this way, the communication between the browser extension and the authentication device may enable an address-based authentication to determine, in real-time as a user is using a website and prior to the user submitting a transaction request via the website, whether the website is associated with an entity bound to the virtual credential such that the user may securely proceed with the transaction or abort the transaction to prevent exposure of the virtual credential information to a potentially fraudulent website.

As indicated above, FIGS. 1A-1C are provided as an example. Other examples may differ from what is described with regard to FIGS. 1A-1C.

Figure 2:
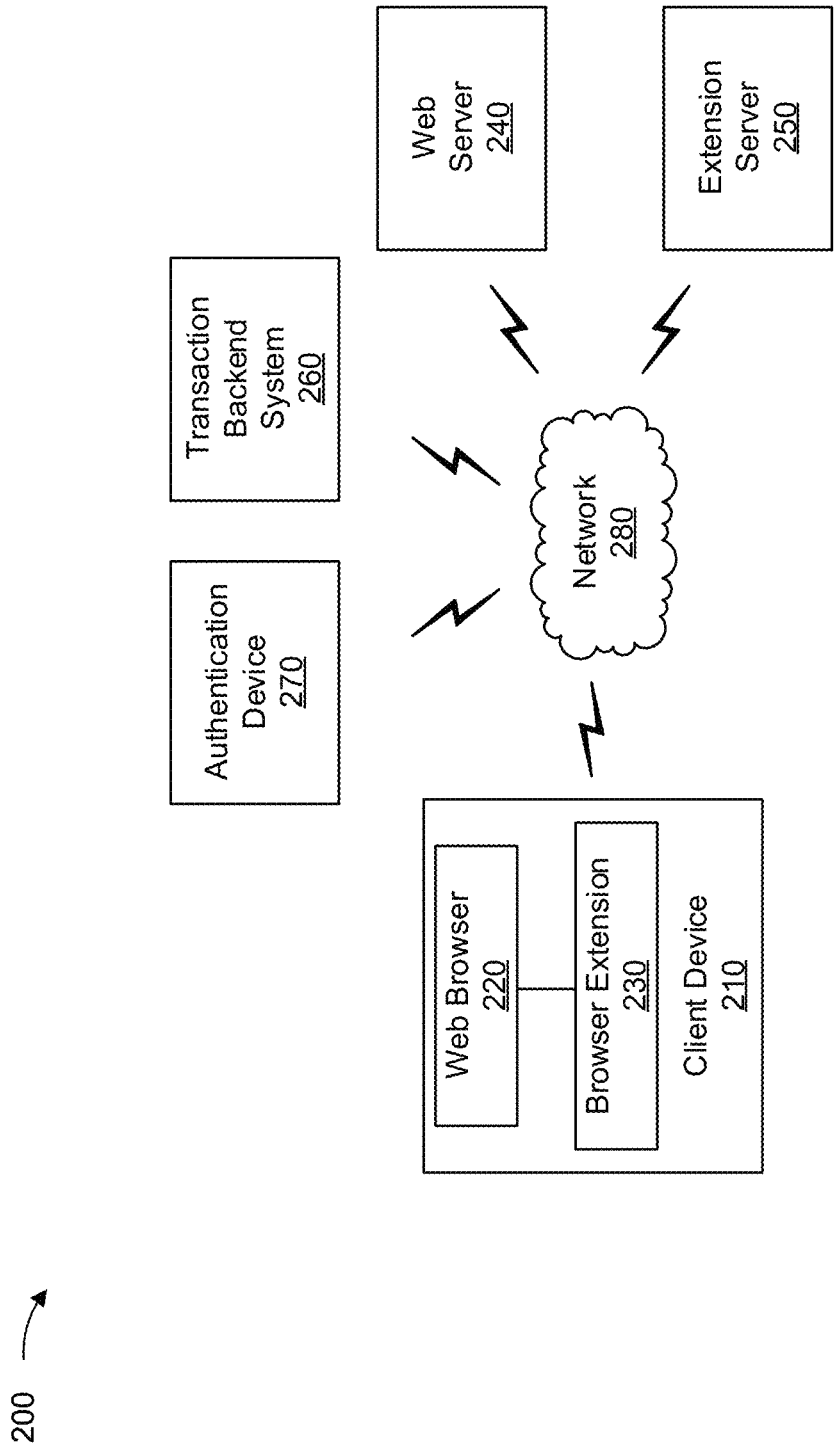
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210 (e.g., which may execute a web browser 220 and a browser extension 230), a web server 240, an extension server 250, a transaction backend system 260, an authentication device 270, and a network 280. Devices of environment 200 may interconnect via wired connections, wireless connections, or a combination of wired and wireless connections.

Client device 210 includes a device that supports web browsing. For example, client device 210 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. Client device 210 may host a web browser 220 and/or a browser extension 230 installed on and/or executing on the client device 210.

Web browser 220 includes an application, executing on client device 210, that supports web browsing. For example, web browser 220 may be used to access information on the World Wide Web, such as web pages, images, videos, and/or other web resources. Web browser 220 may access such web resources using a uniform resource identifier (URI), such as a uniform resource locator (URL), a uniform resource name (URN), and/or the like. Web browser 220 may enable client device 210 to retrieve and present, for display, content of a web page.

Browser extension 230 includes an application, executing on client device 210, capable of extending or enhancing functionality of web browser 220. For example, browser extension 230 may be a plug-in application for web browser 220. Browser extension 230 may be capable of executing one or more scripts (e.g., code, which may be written in a scripting language, such as JavaScript and/or the like) to perform an operation in association with the web browser 220.

Web server 240 includes a device capable of serving web content (e.g., web documents, HTML documents, web resources, images, style sheets, scripts, text, and/or the like). For example, web server 240 may include a server and/or computing resources of a server, which may be included in a data center, a cloud computing environment, and/or the like. Web server 240 may process incoming network requests (e.g., from client device 210) using HTTP and/or another protocol. Web server 240 may store, process, and/or deliver web pages to client device 210. In some implementations, communication between web server 240 and client device 210 may take place using HTTP.

Extension server 250 includes a device capable of communicating with client device 210 to support operations of browser extension 230. For example, extension server 250 may store and/or process information for use by browser extension 230. As an example, extension server 250 may store a list of domains applicable to a script to be executed by browser extension 230. In some implementations, client device 210 may obtain the list (e.g., periodically, based on a trigger, and/or the like), and may store a cached list locally on client device 210 for use by browser extension 230.

Transaction backend system 260 includes one or more devices capable of processing, authorizing, and/or facilitating a transaction. For example, transaction backend system 260 may include one or more servers and/or computing hardware (e.g., in a cloud computing environment or separate from a cloud computing environment) configured to receive and/or store information associated with processing an electronic transaction. Transaction backend system 260 may process a transaction, such as to approve (e.g., permit, authorize, or the like) or decline (e.g., reject, deny, or the like) the transaction and/or to complete the transaction if the transaction is approved. Transaction backend system 260 may process the transaction based on information received from client device 210, such as transaction data (e.g., information that identifies a transaction amount, a merchant, a time of a transaction, a location of the transaction, a web address associated with the merchant, or the like), account information entered into a website displayed in web browser 220 of client device 210, and/or information stored by transaction backend system 260 and/or authentication device 270 (e.g., for fraud detection).

Transaction backend system 260 may be associated with a financial institution (e.g., a bank, a lender, a credit card company, or a credit union) and/or may be associated with a transaction card association that authorizes a transaction and/or facilitates a transfer of funds. For example, transaction backend system 260 may be associated with an issuing bank associated with a primary payment credential or a virtual credential linked to the primary payment credential, an acquiring bank (or merchant bank) associated with a merchant, and/or a transaction card association (e.g., VISA® or MASTERCARD®) associated with a primary payment credential or a virtual credential linked to the primary payment credential. Based on receiving information associated with the primary credential or the virtual credential from client device 210, one or more devices of transaction backend system 260 may communicate to authorize a transaction and/or to transfer funds from an account associated with the primary payment credential or the virtual credential linked to the primary payment credential to an account of an entity (e.g., a merchant) associated with the web server 240.

Authentication device 270 includes one or more devices capable of receiving, generating, storing, processing, providing, and/or routing information associated with authenticating a virtual credential based on a browsing context, as described elsewhere herein. For example, authentication device 270 includes one or more devices capable of processing, authorizing, facilitating, and/or blocking or declining a transaction using a payment credential, such as a primary credential and/or a virtual credential that is linked to a primary credential, based on a web address. For example, authentication device 270 may be associated with transaction backend system 260 and may include a server, such as an application server, a client server, a web server, a database server, a host server, a proxy server, a virtual server (e.g., executing on computing hardware), or a server in a cloud computing system. In some implementations, authentication device 270 includes computing hardware used in a cloud computing environment and/or computing hardware separate from a cloud computing environment.

Network 280 includes one or more wired and/or wireless networks. For example, network 280 may include a cellular network (e.g., a long-term evolution (LTE) network, a code division multiple access (CDMA) network, a 3G network, a 4G network, a 5G network, and/or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
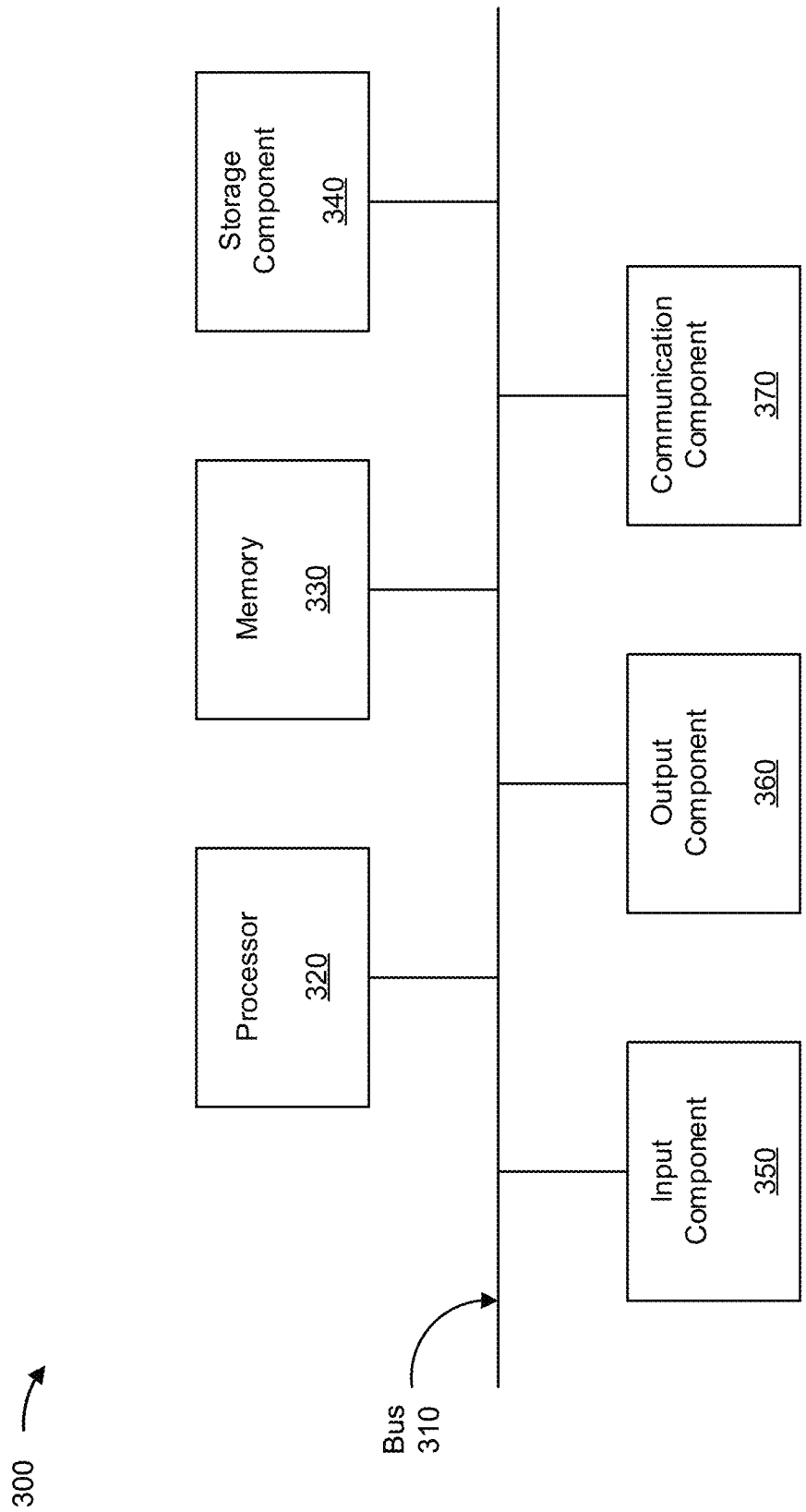
FIG. 3 is a diagram of example components of one or more devices of FIG. 2.

FIG. 3 is a diagram of example components of a device 300, which may correspond to client device 210, web server 240, extension server 250, transaction backend system 260, and/or authentication device 270. In some implementations, client device 210, web server 240, extension server 250, transaction backend system 260, and/or authentication device 270 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
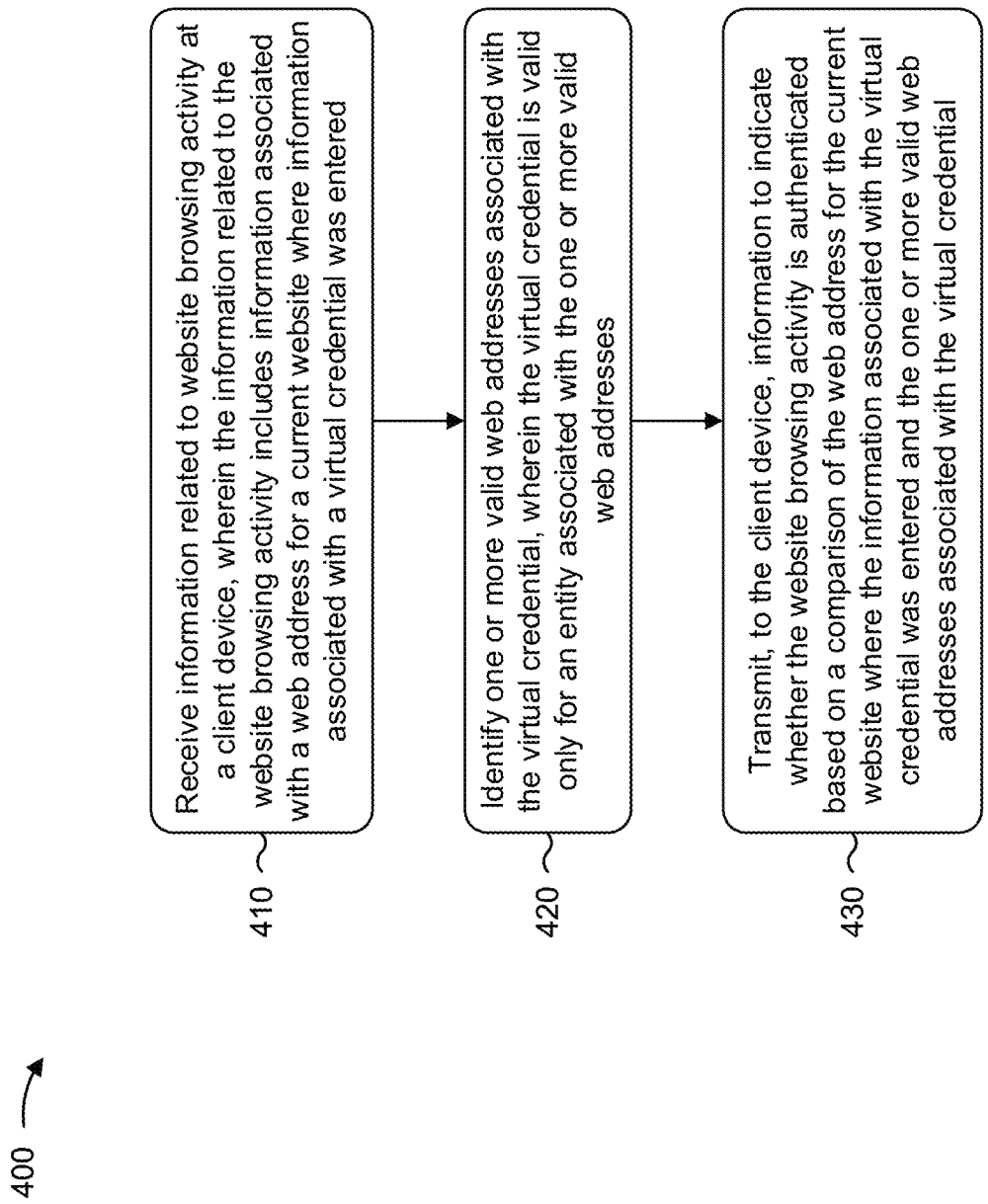

FIG. 4 is a flowchart of an example process 400 associated with authenticating a virtual credential based on a website browsing context. In some implementations, one or more process blocks of FIG. 4 may be performed by an authentication device (e.g., authentication device 270). In some implementations, one or more process blocks of FIG. 4 may be performed by another device or a group of devices separate from or including the authentication device, such as client device 210, web server 240, extension server 250, and/or transaction backend system 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving information related to website browsing activity at a client device, wherein the information related to the website browsing activity includes information associated with a web address for a current website where information associated with a virtual credential was entered (block 410). In some implementations, the website browsing activity includes input of the information associated with the virtual credential in one or more fields of the current website without user interaction with a user interface element to submit the virtual credential for authentication. As further shown in FIG. 4, process 400 may include identifying one or more valid web addresses associated with the virtual credential, wherein the virtual credential is valid only for an entity associated with the one or more valid web addresses (block 420). As further shown in FIG. 4, process 400 may include transmitting, to the client device, information to indicate whether the website browsing activity is authenticated based on a comparison of the web address for the current website where the information associated with the virtual credential was entered and the one or more valid web addresses associated with the virtual credential (block 430).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with authenticating a virtual credential authentication based on a website browsing context. In some implementations, one or more process blocks of FIG. 5 may be performed by a client device (e.g., client device 210). In some implementations, one or more process blocks of FIG. 5 may be performed by another device or a group of devices separate from or including the client device, such as web server 240, extension server 250, transaction backend system 260, and/or authentication device 270. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include detecting website browsing activity that includes entering information associated with a virtual credential on a current website in one or more fields of the current website without user interaction with a user interface element to submit the virtual credential for authentication (block 510). As further shown in FIG. 5, process 500 may include determining a web address associated with the current website based on the website browsing activity that includes entering the information associated with the virtual credential on the current website (block 520). As further shown in FIG. 5, process 500 may include transmitting information identifying the web address associated with the current website to an authentication device (block 530). As further shown in FIG. 5, process 500 may include receiving, from the authentication device, information indicating whether the virtual credential is valid at the current website based on the web address for the current website and one or more valid web addresses associated with the virtual credential (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions, the set of instructions comprising:
one or more instructions that, when executed by one or more processors of a device, cause the device to:
detect, in real-time, website browsing activity that includes entering information associated with a virtual credential on a current website without interacting with a user interface element to submit the virtual credential for authentication,
wherein the information is entered prior to a user submitting a transaction via the website browsing activity, and
wherein the virtual credential is associated with a merchant;
determine a web address associated with the current website based on the website browsing activity;
transmit information identifying the web address associated with the current website to an authentication device;
receive, from the authentication device, information indicating whether the virtual credential is valid at the current website based on the web address for the current website and one or more valid web addresses associated with the virtual credential,
wherein the virtual credential is valid at the current website when the web address is one of the one or more valid web addresses that are associated with the merchant; and
proceed with the transaction by sending the virtual credential to the current website, based on the information indicating that the virtual credential is valid at the current website.

2. The non-transitory computer-readable medium of claim 1, wherein the website browsing activity includes entering the information associated with the virtual credential on the current website.

3. The non-transitory computer-readable medium of claim 1, wherein the virtual credential is one of multiple virtual card numbers linked to a primary account number.

4. The non-transitory computer-readable medium of claim 1, wherein the information received from the authentication device indicates one or more discrepancies between the web address for the current website and the one or more valid web addresses associated with the virtual credential.

5. The non-transitory computer-readable medium of claim 1, wherein the web address associated with the virtual credential includes an original web address for which the virtual credential was created and one or more valid aliases for the web address.

6. The non-transitory computer-readable medium of claim 1, wherein the website browsing activity includes one or more user interactions to enter the information associated with the virtual credential on the current website or to activate a browser extension to automatically populate a user interface on the current website with the information associated with the virtual credential.

7. The non-transitory computer-readable medium of claim 1, wherein the information identifying the web address is received in a message communicated from a browser extension installed in a web browser executing on a client device.

8. A device, comprising:
a memory; and
one or more processors, communicatively coupled to the memory, configured to:
detect, in real-time, website browsing activity that includes entering information associated with a virtual credential on a current website without interacting with a user interface element to submit the virtual credential for authentication,
wherein the information is entered prior to a user submitting a transaction via the website browsing activity, and
wherein the virtual credential is associated with a merchant;
determine a web address associated with the current website based on the website browsing activity;
transmit information identifying the web address associated with the current website to an authentication device;
receive, from the authentication device, information indicating whether the virtual credential is valid at the current website based on the web address for the current website and one or more valid web addresses associated with the virtual credential,
wherein the virtual credential is valid at the current website when the web address is one of the one or more valid web addresses that are associated with the merchant; and
proceed with the transaction by sending the virtual credential to the current website based on the information indicating that the virtual credential is valid at the current website.

9. The device of claim 8, wherein the web address is a uniform resource locator associated with the current website.

10. The device of claim 8, wherein the information transmitted indicates that the website browsing activity is not authenticated based on a comparison indicating that the web address for the current website does not match any of the one or more valid web addresses associated with the virtual credential.

11. The device of claim 8, wherein the website browsing activity includes one or more user interactions to enter the information associated with the virtual credential on the current website.

12. The device of claim 8, wherein the website browsing activity includes one or more user interactions to activate a browser extension to automatically populate a user interface on the current website with the information associated with the virtual credential.

13. The device of claim 8, wherein the information identifying the web address is received in a message communicated from a browser extension installed in a web browser executing on a client device.

14. The device of claim 8, wherein the virtual credential is one of multiple virtual card numbers linked to a primary account number.

15. A method, comprising:
- detecting, by a device and in real-time, website browsing activity that includes entering information associated with a virtual credential on a current website without interacting with a user interface element to submit the virtual credential for authentication,
  - wherein the information is entered prior to a user submitting a transaction via the website browsing activity, and
  - wherein the virtual credential is associated with a merchant;
- determining, by the device, a web address associated with the current website based on the website browsing activity;
- transmitting, by the device, information identifying the web address associated with the current website to an authentication device;
- receiving, by the device and from an authentication device, information indicating whether the virtual credential is valid at the current website based on the web address for the current website and one or more valid web addresses associated with the virtual credential,
  - wherein the virtual credential is valid at the current website when the web address is one of the one or more valid web addresses that are associated with the merchant; and
- proceeding, by the device, with the transaction by sending the virtual credential to the current website based on the information indicating that the virtual credential is valid at the current website.

16. The method of claim 15, further comprising:
- transmitting, by the device, information identifying the web address associated with the current website to the authentication device.

17. The method of claim 15, wherein the virtual credential is one of multiple virtual card numbers linked to a credit card number.

18. The method of claim 15, wherein the web address includes one or more of a host name, a domain name, or a Uniform Resource Locator associated with the current website.

19. The method of claim 15, wherein the virtual credential is valid at the web address associated with a merchant website.

20. The method of claim 15, wherein one or more details associated with the virtual credential include one or more of:
- an account number,
- an expiration date,
- a security code,
- a card verification value (CVV), or
- a primary payment credential linked to the virtual credential.

* * * * *